US010645246B2

(12) United States Patent
Asai

(10) Patent No.: US 10,645,246 B2
(45) Date of Patent: May 5, 2020

(54) NON-TRANSITORY COMPUTER-READABLE MEDIUM AND PORTABLE DEVICE

(71) Applicant: BROTHER KOGYO KABUSHIKI KAISHA, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/362,906

(22) Filed: Mar. 25, 2019

(65) Prior Publication Data
US 2019/0222708 A1    Jul. 18, 2019

Related U.S. Application Data

(63) Continuation of application No. 15/633,841, filed on Jun. 27, 2017, now Pat. No. 10,270,932.

(30) Foreign Application Priority Data

Jun. 28, 2016 (JP) ................................ 2016-127199

(51) Int. Cl.
*H04N 1/00* (2006.01)
(52) U.S. Cl.
CPC ..... *H04N 1/00973* (2013.01); *H04N 1/00251* (2013.01); *H04N 1/00307* (2013.01);
(Continued)
(58) Field of Classification Search
None
See application file for complete search history.

(56) References Cited

U.S. PATENT DOCUMENTS

| 2009/0031252 A1* | 1/2009 | Toda | G06F 9/451 |
| | | | 715/826 |
| 2013/0070264 A1* | 3/2013 | Ishiyama | G06K 15/4065 |
| | | | 358/1.9 |
| 2014/0372882 A1 | 12/2014 | Broadbent, III et al. | |

FOREIGN PATENT DOCUMENTS

JP    2009-031916 A    2/2009

OTHER PUBLICATIONS

Office Action dated Jun. 18, 2018 from parent U.S. Appl. No. 15/633,841.
(Continued)

*Primary Examiner* — Frantz Bataille
(74) *Attorney, Agent, or Firm* — Scully, Scott, Murphy & Presser, PC

(57) ABSTRACT

A non-transitory computer-readable medium having a computer program readable by a computer of a portable device comprising a memory storing a plurality of external programs activated by the computer program and being connectable to an image forming device that executes a formation operation, the computer program causes the portable device to perform: obtaining type information indicating each type of the plurality of external programs; determining whether the corresponding external program is a first type or a second type; pre-processing of activating the external program determined as the first type and obtaining a parameter indicating a condition of generating the image data designated by a user; instructing the image forming device to execute the formation operation; and post-processing of activating the external program determined as the second type with designating the image data formed in the formation operation.

19 Claims, 10 Drawing Sheets

(52) U.S. Cl.
CPC . *H04N 1/00424* (2013.01); *H04N 2201/0039* (2013.01); *H04N 2201/0094* (2013.01)

(56) References Cited

OTHER PUBLICATIONS

Notice of Allowance dated Dec. 4, 2018 from parent U.S. Appl. No. 15/633,841.

\* cited by examiner

FIG. 3

| PROGRAM ID | PROGRAM NAME | FUNCTION INFORMATION | ACTIVATION PARAMETER |
|---|---|---|---|
| 001 | SCAN PARAMETER DESIGNATION | PARAMETER DESIGNATION | — |
| 002 | EXECUTION PLUG-IN DESIGNATION | PARAMETER DESIGNATION | — |
| 003 | SKEW CORRECTION | NOISE REMOVAL | ON |
| 004 | PUNCHED HOLE REMOVAL | — | — |
| 005 | BACKGROUND COLOR CORRECTION | NOISE REMOVAL | ON |
| 006 | LABEL PRINTING | IMAGE EDITING | OFF |
| 007 | OCR | IMAGE EDITING | ON |
| 008 | PAINT | IMAGE EDITING | OFF |

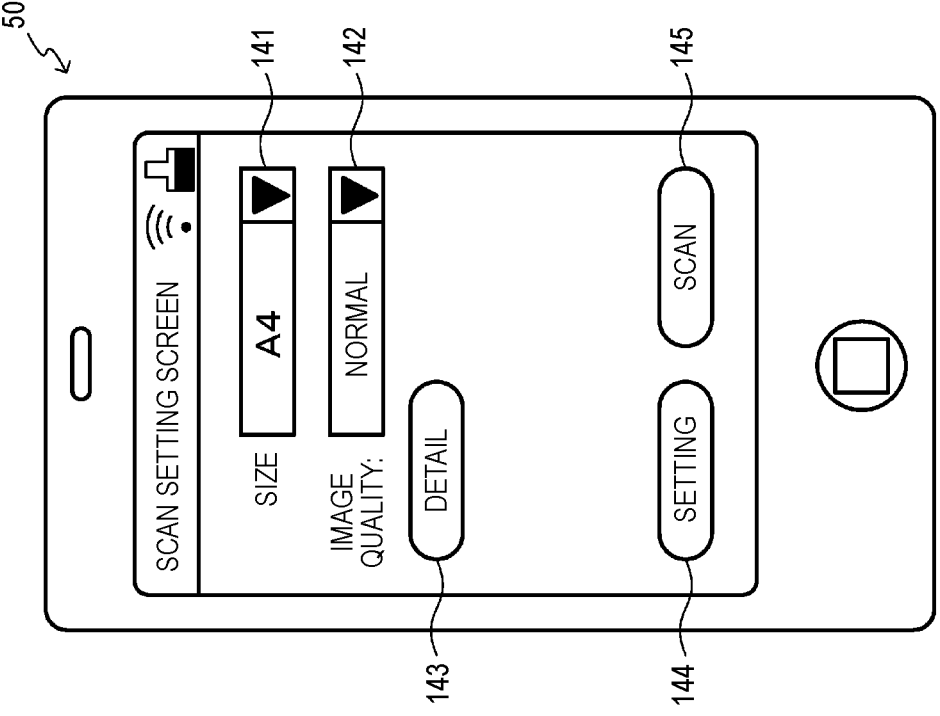
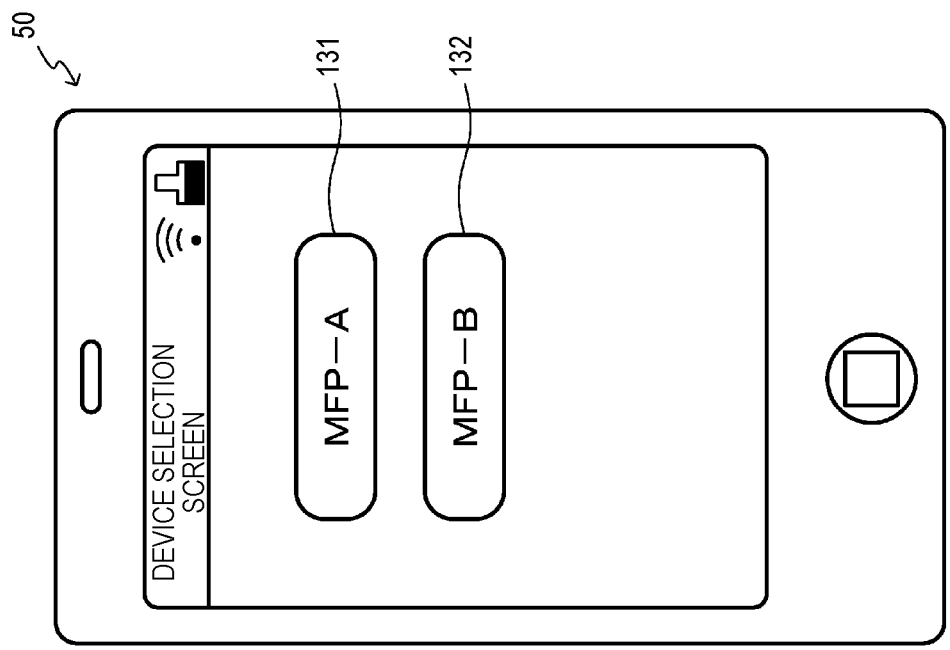

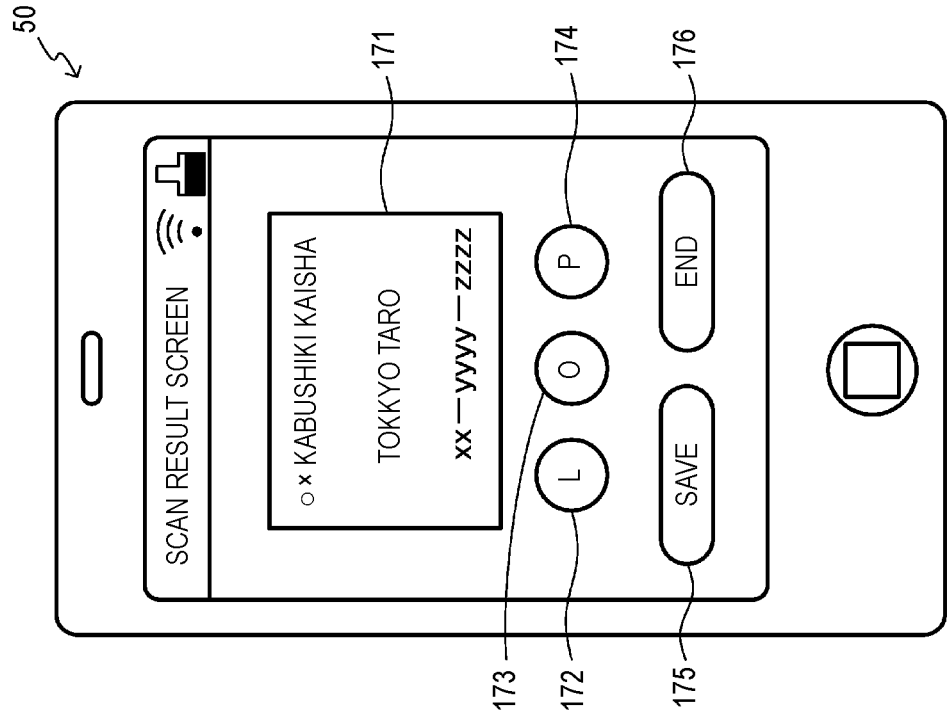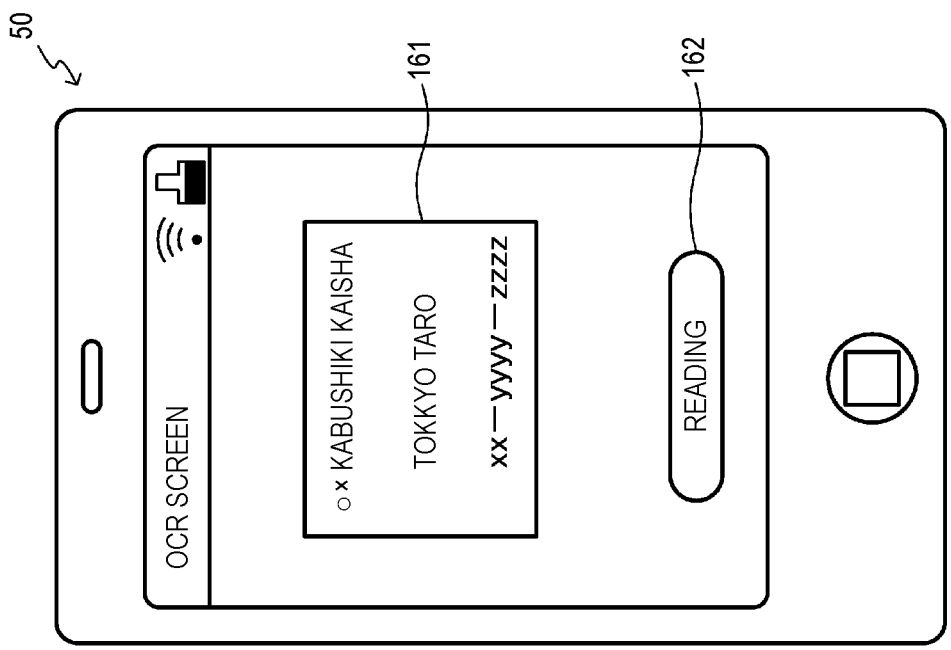

FIG. 10

| PROGRAM ID | PROGRAM NAME | TIMING INFORMATION | ACTIVATION PARAMETER |
|---|---|---|---|
| 001 | SCAN PARAMETER DESIGNATION | BEFORE SCAN | — |
| 002 | EXECUTION PLUG-IN DESIGNATION | BEFORE SCAN | — |
| 003 | SKEW CORRECTION | UNDER SCAN | ON |
| 004 | PUNCHED HOLE REMOVAL | — | — |
| 005 | BACKGROUND COLOR CORRECTION | UNDER SCAN | ON |
| 006 | LABEL PRINTING | AFTER SCAN | OFF |
| 007 | OCR | AFTER SCAN | ON |
| 008 | PAINT | AFTER SCAN | OFF |

NON-TRANSITORY COMPUTER-READABLE MEDIUM AND PORTABLE DEVICE

CROSS-REFERENCE TO RELATED APPLICATION

This application is a continuation application of U.S. Ser. No. 15/633,841 filed on Jun. 27, 2017 and claims priority from Japanese Patent Application No. 2016-127199 filed on Jun. 28, 2016, the entire subject-matter of each of which is incorporated herein by reference.

TECHNICAL FIELD

The disclosure relates to a program of a portable device configured to generate image data by using an external program installed in the portable device.

BACKGROUND

There has been disclosed an information processing apparatus configured to display an icon corresponding to a newly added function on a display and to execute the function as the icon is tapped. The related-art information processing apparatus is configured to enable a user to designate a screen and a position at which each icon is to be displayed.

There has been proposed a program of a portable device having a function of generating image data by using an external program installed in the portable device. The external program that the program can use includes a program that is to be activated before generating the image data and a program that is to be activated after generating the image data. Thus, in such a program, when displaying icons, which correspond to the respective external programs of which activation timings are different, on a user's desired screen, the external programs may not be activated at appropriate timings.

SUMMARY

Illustrative aspects of the disclosure provide a non-transitory computer-readable medium having a computer program for a portable device capable of activating an external program, which is to be used for generation of image data, at an appropriate timing during the generation of the image data.

One illustrative aspect of the disclosure provides a non-transitory computer-readable medium having a computer program stored thereon and readable by a computer of a portable device, the portable device comprising a memory and being connectable to an image forming device that is configured to execute a formation operation of forming image data, the memory storing a plurality of external programs that can be activated by the computer program. The computer program, when executed by the computer, causes the portable device to perform: obtaining type information, the type information indicating each type of the plurality of external programs; determining whether the corresponding external program is a first type or a second type based on the obtained type information, the first type indicating the external program for enabling a user to designate a parameter indicating a condition of generating the image data, the second type indicating the external program for executing processing for the image data generated by the image forming device; pre-processing of activating the external program, which is determined as the first type, and obtaining the parameter designated by the user; and generating the image data in accordance with the parameter obtained in the pre-processing. The generation of the image data comprises: instructing the image forming device to execute the formation operation; and performing post-processing of activating the external program, which is determined as the second type, with designating the image data formed in the formation operation.

Another illustrative aspect of the disclosure provides a non-transitory computer-readable medium having a computer program stored thereon and readable by a computer of a portable device, the portable device comprising a memory and being connectable to an image forming device that is configured to execute a formation operation of forming image data, the memory storing a plurality of external programs that can be activated by the computer program. The computer program, when executed by the computer, causes the portable device to perform: obtaining type information, the type information indicating each type of the plurality of external programs; determining whether the corresponding external program is a first type or a second type based on the obtained type information, the first type indicating the external program that is to be activated before execution of the formation operation, the second type indicating the external program that is to be activated after the execution of the formation operation; pre-processing of activating the external program, which is determined as the first type, and obtaining a parameter indicating a condition of generating the image data designated by a user; and generating the image data in accordance with the parameter obtained in the pre-processing. The generation of the image data comprises: instructing the image forming device to execute the formation operation; and performing post-processing of activating the external program, which is determined as the second type, with designating the image data formed in the formation operation.

According to the above configuration, it is possible to activate the external program, which is to be used for generation of the image data, at the appropriate timing in accordance with the function information before or after the formation instruction processing. Thereby, it is possible to smoothly execute a series of processing of generating the image data.

BRIEF DESCRIPTION OF THE DRAWINGS

FIG. 3 is an example of a program list stored in a memory 62;

FIGS. 6A and 6B depict display examples of a display 53, in which FIG. 6A depicts a menu screen and FIG. 6B depicts a main screen;

FIGS. 7A and 7B depict display examples of the display 53, in which FIG. 7A depicts a device selection screen and FIG. 7B depicts a scan setting screen;

FIGS. 8A and 8B depict display examples of the display 53, in which FIG. 8A depicts a scan setting screen after a [detail] icon 143 is tapped and FIG. 8B depicts an activation setting screen; and FIGS. 9A and 9B depict display examples of the display 53, in which FIG. 9A depicts an OCR screen and FIG. 9B depicts a scan result screen.

FIG. 10 depicts another example of the program list stored in the memory 62.

DETAILED DESCRIPTION

Hereinafter, an illustrative embodiment of the disclosure will be described with reference to the drawings. Meanwhile, the illustrative embodiment to be described later is just an example of the disclosure, and the illustrative embodiment of the disclosure can be appropriately changed without changing the gist of the disclosure. For example, an execution sequence of each processing to be described later can be appropriately changed without changing the gist of the disclosure.

Figure 1:
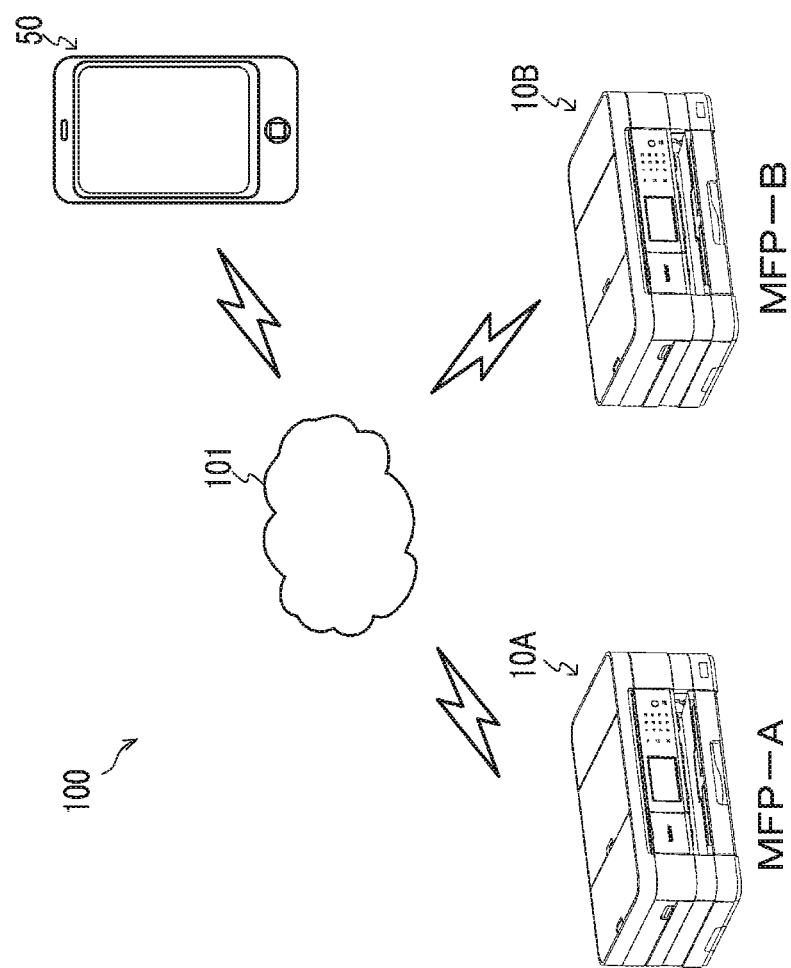
FIG. 1 is a schematic view of a system 100 in accordance with an illustrative embodiment.

FIG. 1 is a schematic view of a system 100 in accordance with an illustrative embodiment. The system 100 shown in FIG. 1 includes MFPs 10A, 10B (hereinafter, also collectively referred to as "MFP 10") and a portable device 50. The MFP 10 and the portable device 50 is configured to perform communication with each other via a communication network 101. The communication network 101 may be a wired LAN, a wireless LAN 102 or a combination thereof, for example.

Figure 2A:
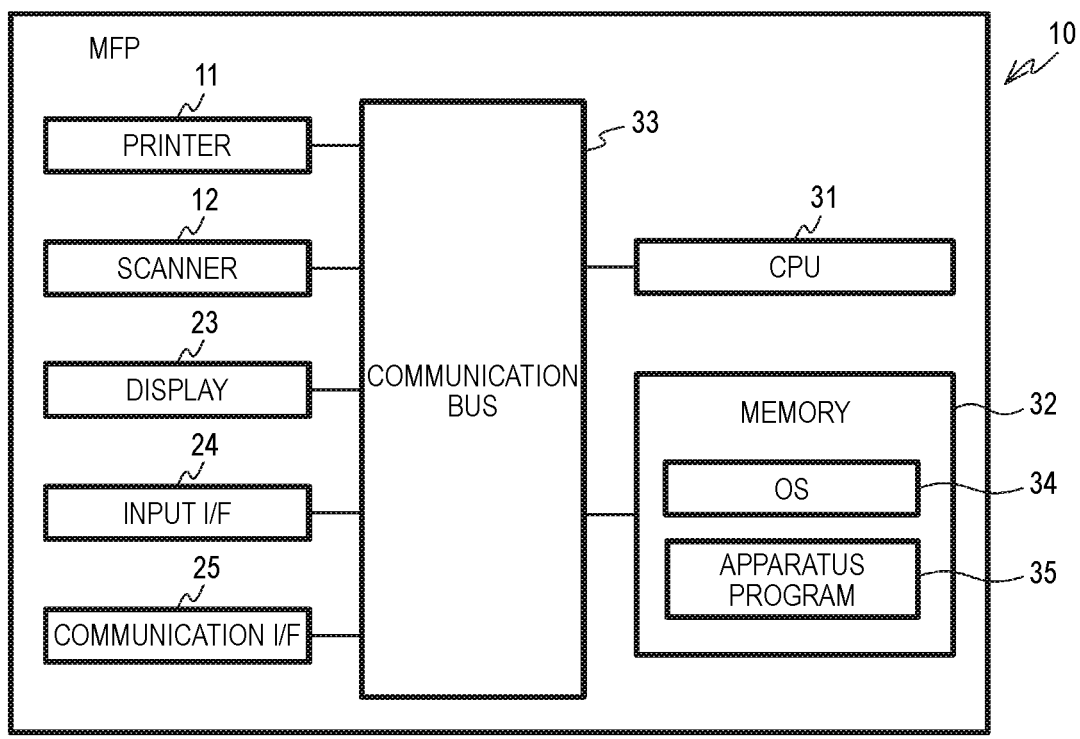
FIG. 2A is a block diagram of an MFP 10.

As shown in FIG. 2A, the MFP 10 (abbreviation of MultiFunction Peripheral) mainly has a printer 11, a scanner 12, a display 23, an input I/F 24, a communication I/F 25, a CPU 31, a memory 32 and a communication bus 33. The respective constitutional elements configuring the MFP 10 are connected to each other through the communication bus 33. In the illustrative embodiment, the printer 11 can be omitted.

The printer 11 is configured to execute a print operation of recording an image expressed by image data onto a sheet. As a recording method of the printer 11, a well-known method such as an inkjet method and an electrophotographic method can be adopted. The scanner 12 is configured to execute a scan operation of reading an image recorded on a document and generating image data (hereinafter, referred to as "scan data"). In the meantime, the operations that can be executed by the MFPs 10A, 10B may be the same or not.

The scanner 12 is configured to execute the scan operation in accordance with an execution condition. The execution condition is specified by a combination of a plurality of condition parameters corresponding to each of a plurality of items (for example, "size", "image quality", "reading surface", "reading color"). The items "size" and "image quality" are examples of the first item, and the items "reading surface" and "reading color" are examples of the second item. Also, the condition parameters of the items "size" and "image quality" are examples of the first parameter, and the condition parameters of the items "reading surface" and "reading color" are examples of the second parameter.

More specifically, the condition parameter of the item "size" indicates a size (for example, "A4", "B5", "name card") of a document on which an image of a reading target is recorded. The condition parameter of the item "image quality" indicates a reading resolution (for example, "normal", "fine") of the scan operation. The condition parameter of the item "reading surface" indicates a surface (for example, "one surface", "both surfaces") of a document of which an image is to be read. The condition parameter of the item "reading color" indicates a color (for example, "color", "monochrome") of an image that is to be read in the scan operation.

The scanner 12 is an example of the image forming device, and the scan operation is an example of the formation operation. However, the specific example of the image forming device is not limited to the scanner 12. For example, a camera capable of executing a photographing operation of imaging a photographic subject to generate photographic data and the like can also be adopted. That is, the image forming device may be any hardware configured to generate the image data. Also, the portable device 50 may be connected to the scanner 12 of the MFP 10 via the communication network 101 or may be connected to a camera (not shown) via the communication bus 63, which is an example of the internal bus.

The display 23 is a liquid crystal monitor, an organic EL display or the like and has a display surface for displaying a variety of information.

The input I/F 24 is a user interface configured to receive a user's input operation. Specifically, the input I/F 24 has buttons and is configured to output a variety of operation signals associated with the pushed buttons to the CPU 31. In addition, the input I/F 24 may have a touch sensor having a film shape and superimposed on the display surface of the display 23. An operation of designating an object displayed on the display surface of the display 23 and an operation of inputting a character string or a number string are examples of the user operation. The "object" includes a character string, an icon, a button, a link, a radio button, a check box, a pull-down menu and the like displayed on the display 23, for example.

The input I/F 24 is configured to output position information indicative of a position on the display surface touched by the user. The input I/F 24 may be implemented as a touch sensor. In the specification, the "touch" includes all operations of bringing an input medium into contact with the display surface. Although the input medium is not in contact with the display surface, "hover" or "floating touch" of bringing the input medium close to a position at which a distance between the input medium and the display surface is very small may be included in the concept of the "touch." The input medium may be a user's finger, a touch pen or the like. A user operation of tapping a position of an icon displayed on the display 23 is an example of the user operation of designating the icon.

The communication I/F 25 is an interface capable of performing communication with an external apparatus through the communication network 101. That is, the MFP 10 is configured to transmit a variety of information to the external apparatus through the communication I/F 25 and to receive a variety of information from the external apparatus through the communication I/F 25. Although a specific communication protocol of the communication I/F 25 is not particularly limited, Wi-Fi (registered trademark of the Wi-Fi Alliance) can be adopted, for example. Also, when the MFP 10 and the portable device 50 are connected to each other by a USB cable or the like, the communication I/F 25 may be a USB interface to which the USB cable is to be detachably mounted.

The CPU 31 is configured to control overall operations of the MFP 10. The CPU 31 is configured to obtain and execute a variety of programs (which will be described later) from the memory 32, based on a variety of information output from the input I/F 24 and a variety of information received from the external apparatus through the communication I/F 25. The CPU 31 and the memory 32 configure an example of the controller.

In the memory 32, an OS 34 and an apparatus program 35 are stored. The apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the MFP 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. In the meantime, an electric signal for carrying a program to be downloaded from a server or the like on the Internet is a computer-readable signal medium, which is a kind of the computer-readable medium, but is not included in the non-transitory computer-readable storage medium. This also applies to the memory 62 of the portable device 50, which will be described later.

Figure 2B:
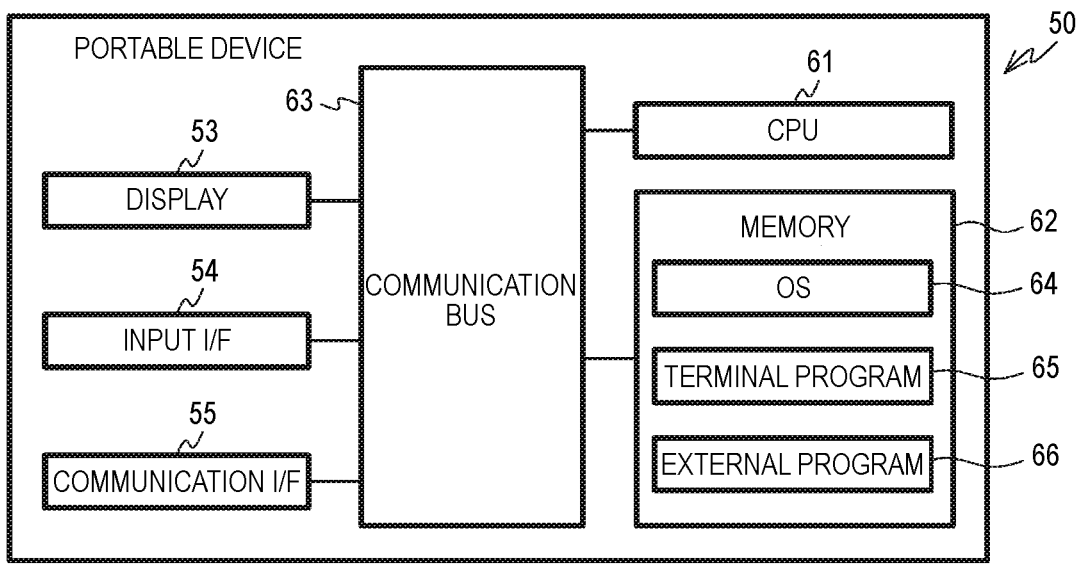
FIG. 2B is a block diagram of a portable device 50.

As shown in FIG. 2B, the portable device 50 mainly has a display 53, n input I/F 54, a communication I/F 55, a CPU 61, a memory 62 and a communication bus 63. Since the display 53, the input I/F 54, the communication I/F 55, the CPU 61, the memory 62 and the communication bus 63 included in the portable device 50 have the same configurations as the display 23, the input I/F 24, the communication I/F 25, the CPU 31, the memory 32 and the communication bus 33 included in the MFP 10, the descriptions thereof are omitted. The CPU 61 and the memory 62 configure an example of the controller.

The portable device 50 may be a portable phone, a smart phone, a tablet terminal, a PC or the like, for example. More specifically, the display 53 of the portable device 50 preferably has a display screen size of 12 inch or less, and more preferably 8 inch or less. Also, the input I/F 54 of the portable device 50 is preferably a touch sensor superimposed on the display surface of the display 53. The memory 62 is configured to store therein an OS 64, a terminal program 65 and an external program 66.

The OS 64 may be Android (registered trademark of Google Inc.) OS, iOS (registered trademark of Cisco Systems, Inc.), Windows Phone (registered trademark of Microsoft Corporation) Operating System or the like, for example. The OS 64 can execute a plurality of programs installed in the portable device 50 in parallel. The plurality of programs is virtually executed in parallel by a time-division multiplex method, for example. Also, the OS 64 is configured to execute one of the plurality of programs, which are to be executed in parallel, at the foreground and to execute the other programs at the background.

The foreground is a state where a screen associated with execution of the program is displayed in most of a display region of the display 53, for example. The background is a state where a screen associated with execution of a program different from the program is not displayed in most of the display region of the display 53, for example. That is, the portable device 50 can display on the display 53 only a screen associated with execution of a program, which is being executed at the foreground, of the plurality of programs being executed in parallel.

The terminal program 65 is an example of the main program configured to enable the MFP 10 connected via the communication I/F 55 to execute the print operation or the scan operation. The terminal program 65 is configured to transmit print instruction information for executing the print operation and scan instruction information for executing the scan operation to the MFP 10 via the communication I/F/55, for example. Also, the terminal program 65 can activate the external program 66 installed in the portable device 50 in a so-called plug-in manner.

The external program 66 is installed in or uninstalled from the portable device 50, in accordance with a user instruction input through the input I/F 54, for example. The external program 66 that can be activated by the terminal program 65 has a function for assisting processing of the terminal program 65, for example. In the illustrative embodiment, the external program 66 configured to assist processing by which the terminal program 65 enables the MFP 10 to execute the scan operation is mainly described. In the meantime, the external program 66 is a program that is separate from the terminal program 65 and can be independently executed, and is different from a subroutine of the terminal program 65.

The external program 66 is activated by an API (hereinafter, "activation API") that is provided by the OS 64, for example. The terminal program 65 is configured to designate, as an argument, a program ID of the external program 66, for example, and to execute the activation API. As the activation API is executed, the OS 64 activates the external program 66 identified with the designated program ID. The external program 66 is configured to execute a predetermined operation, for example, and to provide an execution result of the operation to the terminal program 65, as a return value of the activation API.

As shown in FIG. 3, for example, the memory 62 can store therein a program list. The program list includes one or more program records. The program record is stored in the memory 62 upon the install of the terminal program 65, for example. The program record corresponds to one of the plurality of external programs 66 that can be activated by the terminal program 65. The program record includes a program ID, a program name, function information and an activation parameter.

The program ID is an example of the program identification information for identifying the external program 66. Hereinafter, the external program 66 identified with the program ID "xxx" may also be referred to as "external program 'xxx'". The program name is a name of the external program 66. The function information is information indicative of a function of the corresponding external program 66. The activation parameter is information indicating whether or not to actually activate the corresponding external program 66, in the program record in which the function information "noise removal" or "image editing" is set.

The function information is an example of the type information indicative of a function of the external program 66. In the function information, a "parameter designation" indicating a function by which a user is enabled to designate a parameter indicative of a condition of generating image data, a function "noise removal" of removing a noise from scan data or a function "image editing" of substantially editing scan data is set. The function information "parameter designation" indicates a first function by which a user is enabled to designate a parameter indicative of a condition of generating image data in generation processing (S37 to S43), which will be described later. In the meantime, the function information "noise removal" and "image editing" indicates a second function of executing processing for image data that is to be generated by the scanner 12.

In the meantime, the description "removing a noise from scan data" indicates that an image (for example, a punched hole, a background color), which is not a reading target in the scan operation, and data (for example, skew), which has not been recorded on a document read by the scanner 12, are to be removed from the scan data, for example. In the meantime, the description "substantially editing scan data" indicates that a part of an image, which is a reading target in the scan operation, is to be extracted (for example, a character string recorded on a name card is to be extracted), a shape of the image is to be changed (for example, a photograph is to be trimmed in conformity to a shape of a CD-ROM) or a new image is to be added to the image (a handwritten pattern is to be synthesized), for example.

In the activation parameter, a value "ON" indicating that the corresponding external program 66 is to be activated in S39 and S41 (which will be described later) or a value "OFF" indicating that the corresponding external program is not to be activated is set. The setting value of the activation parameter can be changed by the terminal program 65 or the external program 66, for example.

The external program 66 indicated by a program name "scan parameter designation" has a first function by which the user is enabled to designate an execution condition of the scan operation that the terminal program 65 enables the MFP 10 to execute, for example. The external program 66 indicated by a program name "execution plug-in designation" has a first function by which the user is enabled to designate the external program 66, which is to be activated in S39 and S41, of the plurality of external programs 66 in which the function information "noise removal" or "image editing" is set. The external program 66 having the first function is an example of the first type of the external program 66.

The external program 66 indicated by a program name "skew correction" has a second function of correcting a skew in scan data when the scanner 12 has read a skewed document, for example. The external program 66 indicated by a program name "punched hole removal" has a second function of removing an image indicative of a punched hole from scan data when the scanner 12 has read a document in which the punched hole is formed, for example. The external program 66 indicated by a program name "background color correction" has a second function of replacing a background color of a document in scan data with another color, for example. Since this function has been already well-known, the detailed description thereof is omitted. The external program 66 having the second function is an example of the second type of the external program 66.

The external program 66 indicated by a program name "label printing" has a second function of instructing the MFP 10 to execute a print operation of generating an image to be recorded on a surface of a CD-ROM and recording the generated image on the CD-ROM, through the terminal program 65, for example. The external program 66 indicated by a program name "OCR" has a second function of extracting a character string included in scan data, as text data, for example. The external program 66 indicated by a program name "paint" has a second function of synthesizing a pattern (for example, a picture, a character string and the like), which is input by the user through the input I/F 54, into an image represented by scan data, for example. The external program 66 having the second function is an example of the second type of the external program 66.

In the meantime, the external program 66 in which the function information "parameter designation" is set is preferably activated before the scan operation is executed. On the other hand, the external program 66 in which the function information "noise removal" or "image editing" is set is preferably activated after the scan operation is executed. Also, the external program 66 in which the function information "noise removal" is set is preferably activated earlier than the external program 66 in which the function information "image editing" is set. That is, the function information is information that can be used to specify an activation timing of the corresponding external program 66.

Figure 5:
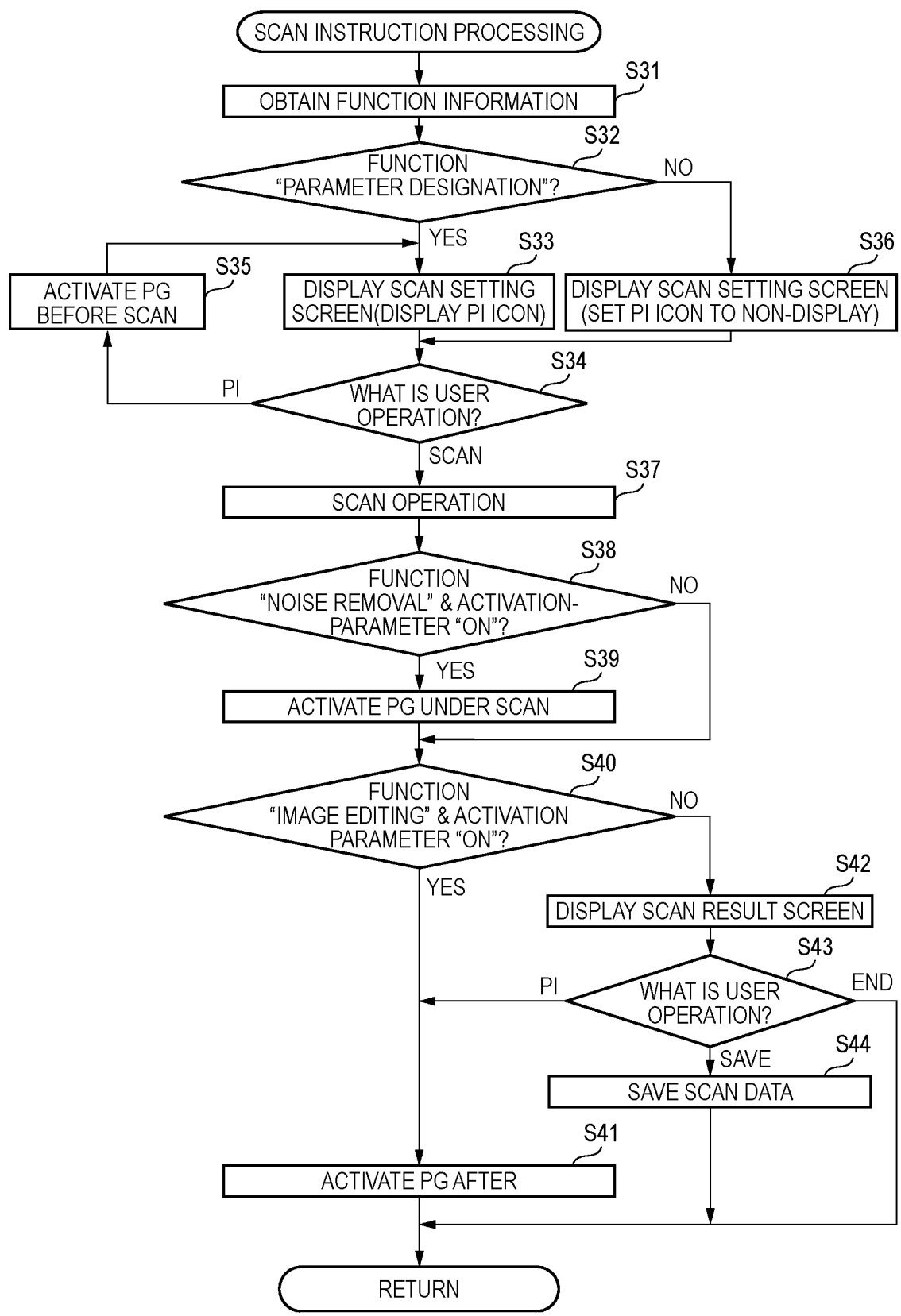
FIG. 5 is a flowchart of scan instruction processing.

In FIG. 5 (which will be described later), the external program 66 in which the function information "parameter designation" is set is referred to as "PG before scan", the external program 66 in which the function information "noise removal" is set is referred to as "PG under scan", and the external program 66 in which the function information "image editing" is set is referred to as "PG after scan". That is, the PG before scan is activated before the execution of the scan operation, the PG under scan is activated after the execution of the scan operation and earlier than the PG after scan, and the PG after scan is activated after the executions of the scan operation and the PG under scan.

Also, although not shown, the memory 62 can store therein designated apparatus IDs. The designated apparatus ID is an apparatus ID for identifying the MFP 10 (hereinafter, referred to as "designated apparatus"), which is designated by the user through the terminal program 65, of the MFPs 10A, 10B capable of performing communication with the portable device 50 via the communication network 101. In the illustrative embodiment, the MFP 10A is identified with an apparatus ID "MFP-A", and the MFP 10B is identified with an apparatus ID "MFP-B".

[Operations of System 100]

Figure 4B:
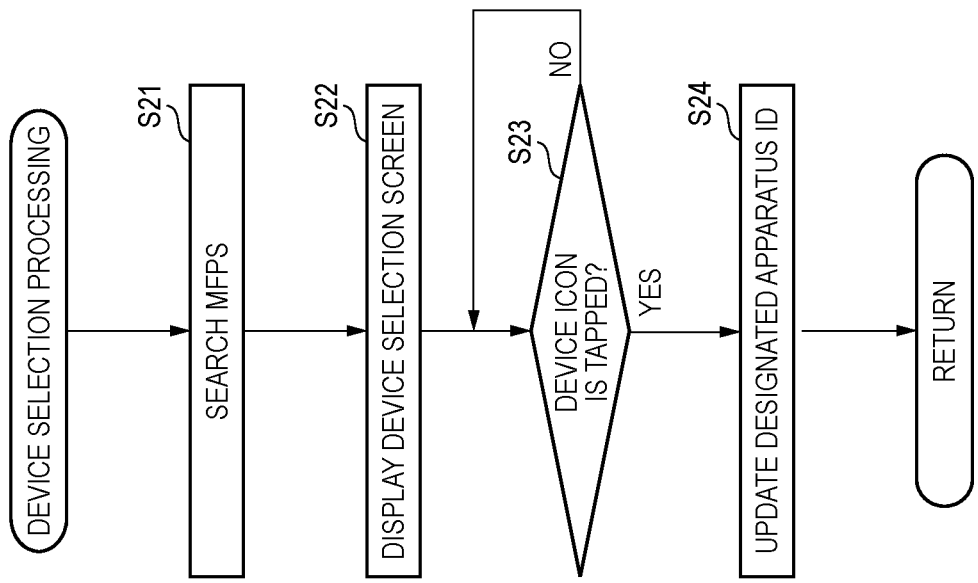
FIG. 4B is a flowchart of device selection processing.
Figure 4A:
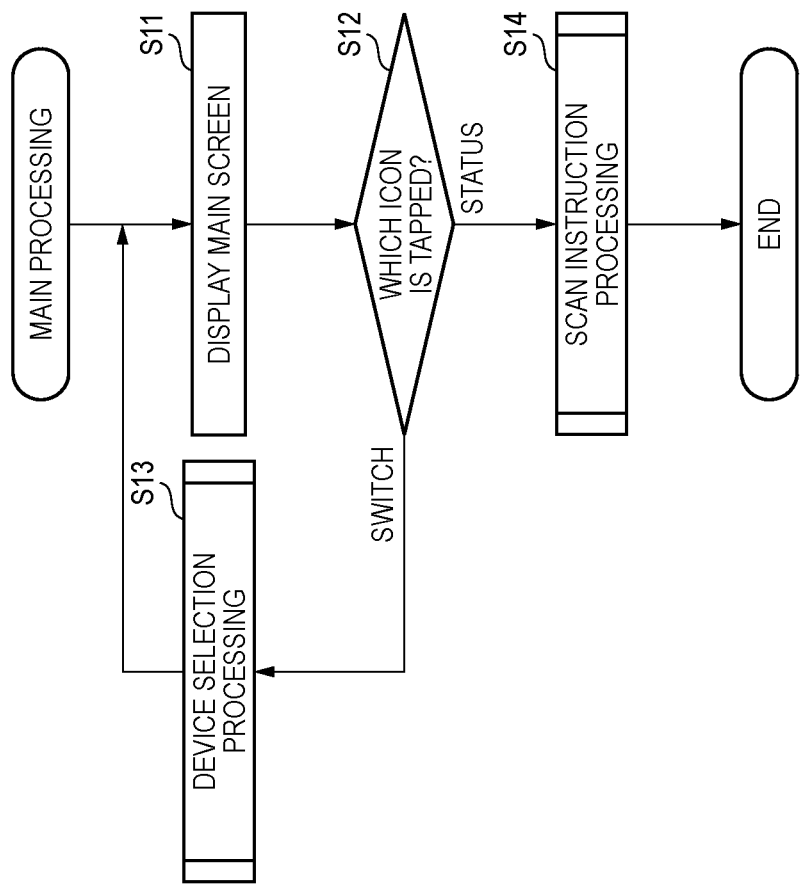
FIG. 4A is a flowchart of main processing.

Operations of the system 100 in accordance with the illustrative embodiment are described with reference to FIGS. 4 and 5. Meanwhile, in the illustrative embodiment, it is assumed that the external program "004" of the plurality of external programs 66 corresponding to the program records shown in FIG. 3 is not installed in the portable device 50 and the other external programs 66 are installed in the portable device 50.

A flowchart of the specification basically indicates processing that is to be executed by the CPUs 31, 61 in accordance with commands described in the program. That is, in the below descriptions, the processing of "determination", "extraction", "selection", "calculation", "determining", "specifying", "control" and the like indicates the processing of the CPUs 31, 61. The processing that is to be executed by the CPUs 31, 61 includes hardware controls through the OSs 34, 64, too. Also, in the specification, "data" is expressed by a bit string that can be read by a computer. The data having substantially the same meaning and the different formats is handled as the same data. This also applies to the "information" of the specification.

Figure 6A:
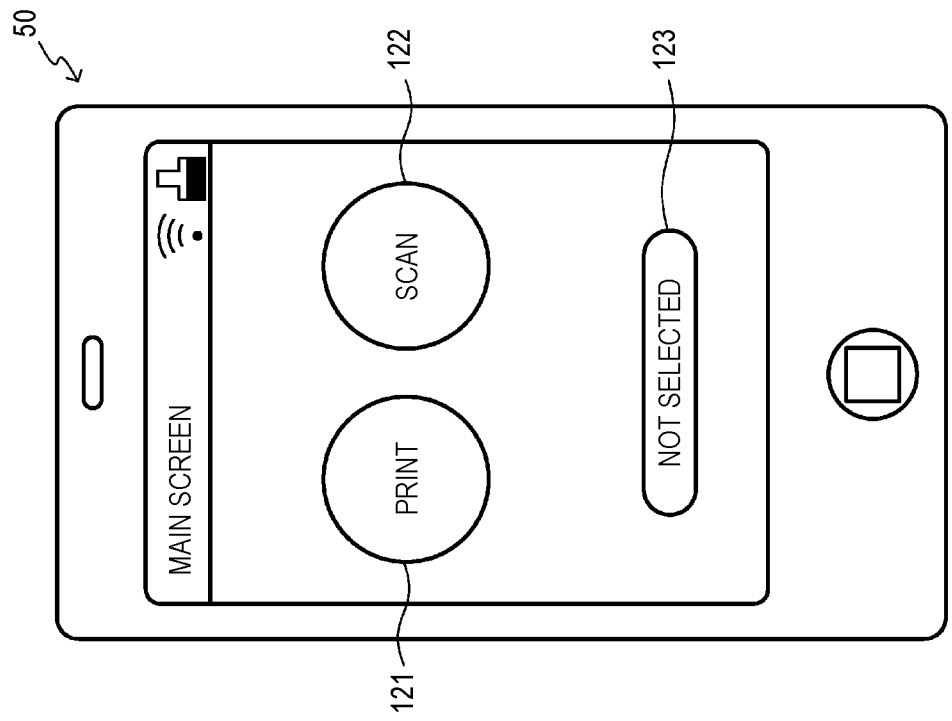

First, the OS 64 of the portable device 50 displays a menu screen shown in FIG. 6A on the display 53. The menu screen includes a plurality of program icons 111, 112, 113, 114, 115, 116, 117, 118. The program icons 111 to 118 correspond to the programs installed in the portable device 50. For example, the program icons 111 to 117 correspond to the external programs 66 installed in the portable device 50, and the program icon 118 corresponds to the terminal program 65. The OS 64 receives a user operation of designating one of the program icons 111 to 118, through the input I/F 54.

As an example, when a designation on the program icon 111 is received through the input I/F 54, the OS 64 activates the external program "001" and executes the corresponding program at the foreground. As another example, when a designation on the program icon 118 is received through the input I/F 54, the OS 64 activates the terminal program 65 and executes the corresponding program at the foreground. Hereinafter, processing that is executed when the program icon 118 is designated is described.

Figure 6B:
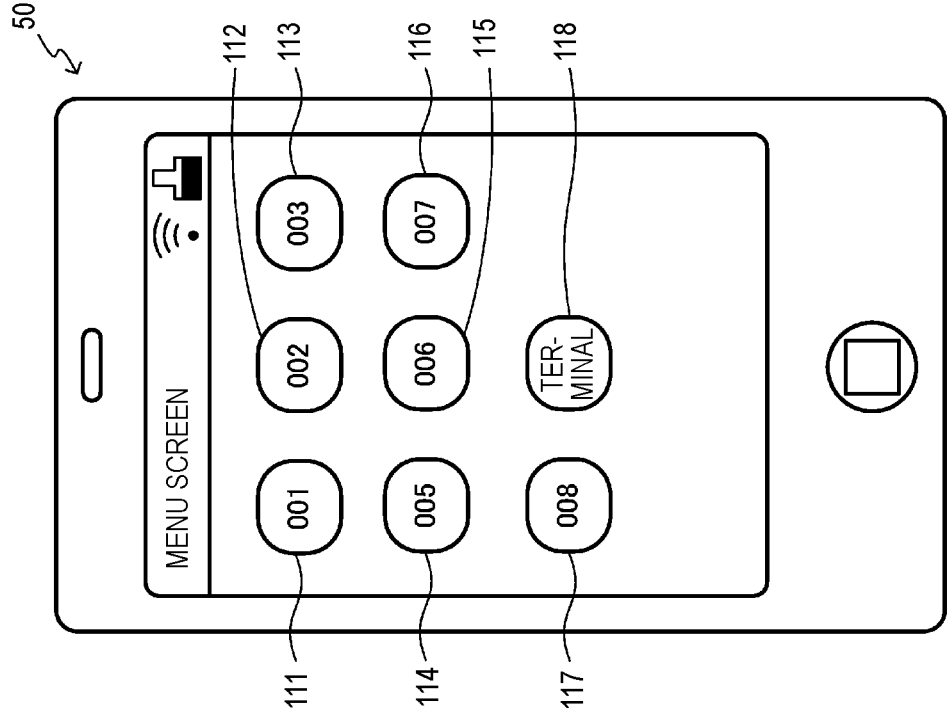

When the terminal program 65 of the portable device 50 is activated by the OS 64, it displays a main screen shown in FIG. 6B on the display 53 (S11). The main screen is an example of the third screen including operation icons 121, 122 and a switching icon 123. Then, the terminal program 65 receives a user operation on the main screen through the input I/F 54 (S12). The processing of S11 is an example of the third display processing, and the processing of S12 is an example of the third reception processing.

The operation icon 121 is an object for receiving an execution instruction of the print operation. The operation icon 122 is an example of the fourth object for receiving an execution instruction of the scan operation. The switching icon 123 is an object for receiving a switching instruction of a designated apparatus. In the meantime, when the designated apparatus ID is not stored in the memory 62, a character string "not selected" indicating that a designated apparatus has not been selected is described in the switching icon 123. On the other hand, although not shown, when the designated apparatus ID is stored in the memory 62, the corresponding designated apparatus ID is described in the switching icon 123.

Subsequently, when a designation on the switching icon 123 is received through the input I/F 54 (S12: switching), for example, the terminal program 65 executes device selection processing (S13). The device selection processing is described in detail with reference to FIG. 4B.

[Device Selection Processing]

First, the terminal program 65 searches the plurality of MFPs 10 capable of performing communication via the communication I/F 55 by using an SNMP (abbreviation of Simple Network Management Protocol) (S21). Specifically, the terminal program 65 broadcasts transmission request information to the communication network 101 via the communication I/F 55. Then, the terminal program 65 receives the apparatus IDs, which are transmitted by the MFPs 10A, 10B as a response to the transmission request information, via the communication I/F 55. That is, the terminal program 65 specifies the MFPs 10A, 10B, which are transmission sources of the apparatus IDs, as the MFP 10 that can perform communication. In the meantime, as the method of searching the MFP 10 that can perform communication, the other well-known methods can also be adopted.

Then, the terminal program 65 displays a device selection screen shown in FIG. 7A on the display 53 (S22). The device selection screen includes device icons 131, 132. The device icons 131, 132 correspond to the MFPs 10A, 10B specified in S21. Also, the apparatus IDs of the corresponding MFPs 10A, 10B are described in the device icons 131, 132. Then, the terminal program 65 receives a user operation on the device selection screen through the input I/F 54 (S23).

Then, when a designation on the device icon 131 is received through the input I/F 54 (S23: Yes), for example, the terminal program 65 stores the apparatus ID received from the MFP 10A corresponding to the device icon 131 in the memory 62, as the designated apparatus ID (S24). When the designated apparatus ID has been already stored in the memory 62, the terminal program 65 overwrites the designated apparatus ID with the new designated apparatus ID.

Returning to FIG. 4A, the terminal program 65 displays the main screen on the display 53 (S11). In the main screen after the device icon 131 is designated, the designated apparatus ID "MFP-A" is described in the switching icon 123. Then, when a designation on the operation icon 122 is received through the input I/F 54 (S21: operation), the terminal program 65 executes scan instruction processing (S14). The tapping on the operation icon 122 corresponds to an execution instruction of generation processing, which will be described later. The scan instruction processing is described in detail with reference to FIG. 5.

[Scan Instruction Processing]

First, the terminal program 65 obtains the function information of the external program 66 installed in the portable device 50 (S31). In the illustrative embodiment, it is assumed that the function information "parameter designation" corresponding to the external program "001", the function information "parameter designation" corresponding to the external program "002", the function information "noise removal" corresponding to the external program "003", the function information "noise removal" corresponding to the external program "005", the function information "image editing" corresponding to the external program "006", the function information "image editing" corresponding to the external program "007" and the function information "image editing" corresponding to the external program "008" are obtained. The processing of S31 is an example of the obtaining processing.

In S31, the terminal program 65 designates, as an argument, the program ID registered in the program list and activates an API (hereinafter, referred to as "existence confirmation API") that is provided by the OS 64. Then, the terminal program 65 determines whether the external programs 66 identified with the program IDs designated as an argument have been installed in the portable device 50, based on a return value of the existence confirmation API. Then, the terminal program 65 obtains the function information from the program records of the external programs 66 for which it is determined that the corresponding external programs have been installed in the portable device 50.

That is, the terminal program 65 obtains the function information of the external programs "001" to "003" and "005" to "008", which have been installed in the portable device 50 at the present moment, of the external programs "001" to "008" identified with the program IDs registered in the program list. In the meantime, the obtaining timing of the function information is not limited to S31 and the function information may be obtained in S11.

Then, the terminal program 65 determines whether the function information "parameter designation" has been obtained in S31 (S32). Then, when it is determined that the function information "parameter designation" of the external programs "001", "002" has been obtained (S32: Yes), the terminal program 65 displays a scan setting screen shown in FIG. 7B on the display 53 (S33). The scan setting screen is an example of the first screen including pull-down menus 141, 142, a [detail] icon 143, a [setting] icon 144 and a [scan] icon 145. Then, the terminal program 65 receives a user operation on the scan setting screen through the input I/F 54 (S34). The processing of S32 is an example of the determination processing, the processing of S33 is an example of the first display processing, and the processing of S34 is an example of the first reception processing.

The pull-down menus 141, 142 are examples of the first object for receiving a designation on one of a plurality of candidates for the condition parameters of the corresponding items "size" and "image quality". The [detail] icon 143 and the [setting] icon 144 are examples of the second object (in FIG. 5, referred to as "PI icon" or "PI") for receiving an instruction to activate the external programs "001", "002". The [scan] icon 145 corresponds to an instruction for enabling the designated apparatus to execute the scan operation.

In each of the pull-down menus 141, 142, one of candidates for the plurality of condition parameters that can be designated with respect to the corresponding item is designated. The designated condition parameters are displayed in the pull-down menus 141, 142. Further, the pull-down menus 141, 142 have a plurality of options corresponding to the candidates for the condition parameters, respectively. The pull-down menu 141 corresponding to the item "size" has three options corresponding to candidates "A4", "B5" and "name card" for the condition parameter. Also, the pull-down menu 142 corresponding to the item "image quality" has two options corresponding to candidates "normal" and "fine" of the condition parameter.

On the other hand, when it is determined that the function information "parameter designation" has not been obtained in S31 (S32: No), the terminal program 65 displays a scan setting screen, which does not include the [detail] icon 143 and the [setting] icon 144, on the display 53 (S36). More specifically, when the function information "parameter designation" of the external program "001" is not obtained, the terminal program 65 sets the [detail] icon 143 to a non-display state. Also, when the function information "parameter designation" of the external program "002" is not obtained, the terminal program 65 sets the [setting] icon 144 to a non-display state. In the meantime, when the function information "parameter designation" is not obtained, the corresponding icon may be displayed in a non-selectable aspect (for example, gray-out) on the scan setting screen, instead of setting the corresponding icon to a non-display state.

Although not shown, when a user operation of changing the condition "A4" designated in the pull-down menu 141 to "name card" is received through the input I/F 54, for example, the terminal program 65 changes the condition parameter displayed in the pull-down menu 141 from "A4" to "name card". Likewise, when a user operation of changing the condition "normal" designated in the pull-down menu 141 to "fine" is received through the input I/F 54, for example, the terminal program 65 changes the condition parameter displayed in the pull-down menu 142 from "normal" to "fine".

Subsequently, when a designation on the [detail] icon 143 is received through the input I/F 54 (S34: PI), for example, the terminal program 65 activates the external program "001" associated with the [detail] icon 143 (S35). That is, the terminal program 65 designates the program ID "001", as an argument, and activates the activation API. Then, the OS 64 activates the external program "001" identified with the program ID "001", which is an argument of the activation API, at the background.

When the external program "001" is activated from the terminal program 65 by the activation API, the external program "001" provides the terminal program 65 with the candidate parameters "one surface" and "both surfaces", which are candidates for the condition parameter of the item "reading surface", and the candidate parameters "color" and "monochrome", which are candidates for the condition parameter of the item "reading color", as the return value of the activation API, and ends the processing. The terminal program 65 obtains the candidate parameters, as the return value of the activation API.

Figure 8A:
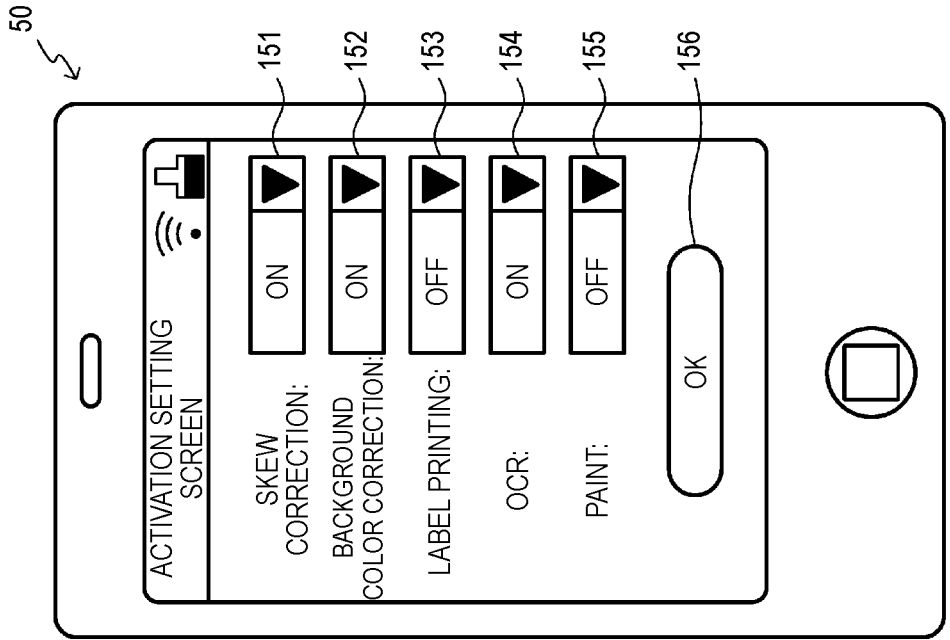

Then, when the candidate parameters are obtained from the external program "001", the terminal program 65 displays a scan setting screen shown in FIG. 8A on the display 53 (S33). The scan setting screen shown in FIG. 8A is different from the scan setting screen shown in FIG. 7B, in that a [non-display] icon 146 is displayed instead of the [detail] icon 143 and pull-down menus 147, 148 are added.

Then, the terminal program 65 receives a user operation on the scan setting screen shown in FIG. 8A through the input I/F 54 (S34).

The [non-display] icon 146 corresponds to an instruction to set the pull-down menus 147, 148 to a non-display state (that is, to display the scan setting screen shown in FIG. 7B). The pull-down menus 147, 148 correspond to one of a plurality of items "reading surface" and "reading color" configuring the execution condition of the scan operation, respectively. The pull-down menus 147, 148 have a plurality of options corresponding to the obtained candidate parameters. The details of the pull-down menus 147, 148 are the same as the pull-down menus 141, 142.

Although not shown, when a user operation of changing the condition parameter "one surface" designated in the pull-down menu 147 to "both surfaces" is received through the input I/F 54, for example, the terminal program 65 changes the condition parameter displayed in the pull-down menu 147 from "one surface" to "both surfaces". Likewise, when a user operation of changing the condition parameter "color" designated in the pull-down menu 148 to "monochrome" is received through the input I/F 54, for example, the terminal program 65 changes the condition parameter displayed in the pull-down menu 148 from "color" to "monochrome".

That is, the terminal program 65 obtains the plurality of candidate parameters, which are candidates for the condition parameter, from the activated external program "001". Then, the terminal program 65 receives a user operation of designating one of the plurality of obtained candidate parameters as the condition parameter, through the input I/F 54. This processing is an example of the pre-processing of activating the external program "001", for which it is determined that "parameter designation" has been set in the function information, and obtaining the parameter designated by the user.

Then, when a designation on the [setting] icon 144 is received through the input I/F4 (S34: PI), for example, the terminal program 65 activates the external program "002" associated with the [setting] icon 144 (S35). That is, the terminal program 65 designates the program ID "002", as an argument, and activates the activation API. Then, the OS 64 activates the external program "002" identified with the program ID "002", which is an argument of the activation API, at the foreground. Also, the OS 64 switches the terminal program 65 from the foreground to the background.

Figure 8B:
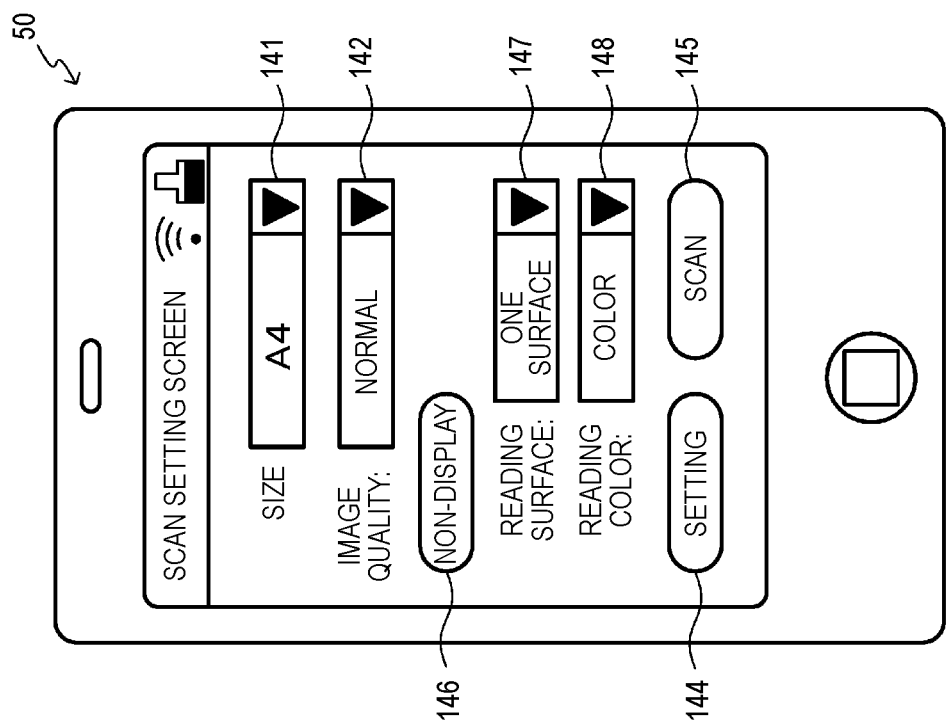

When the external program "002" is activated from the terminal program 65 by the activation API, the external program "002" displays an activation setting screen shown in FIG. 8B on the display 53. The activation setting screen includes pull-down menus 151, 152, 153, 154, 155 and an [OK] icon 156. The pull-down menus 151 to 155 are objects for receiving designations on the activation parameters of the external programs "003", "005", "006", "007", "008" in which the function information obtained in S31 has "noise removal" and "image editing" set therein.

When a user operation of changing the activation parameter "ON" designated in the pull-down menu 153 to "OFF" is received through the input I/F 54, for example, the external program "002" changes the activation parameter displayed in the pull-down menu 153 from "ON" to "OFF". This also applies to the other pull-down menus. When a designation on the [OK] icon 156 is received through the input I/F 54, the external program "002" provides the terminal program 65 with the activation parameters designated in the respective pull-down menus 151 to 155, as the return value of the activation API, and ends the processing. The terminal program 65 obtains the activation parameter as the return value of the activation API and is switched from the background to the foreground by the OS 64.

That is, the terminal program 65 obtains the activation parameter, which is received through the input I/F 54 by the activated external program "002", from the external program "002". This processing is an example of the pre-processing of activating the external program "002", for which it is determined that "parameter designation" has been set in the function information, and obtaining the parameter designated by the user.

In the illustrative embodiment, it is assumed that the terminal program 65 obtains the activation parameter "ON" of the external program "003", the activation parameter "ON" of the external program "005", the activation parameter "OFF" of the external program "006", the activation parameter "ON" of the external program "007" and the activation parameter "OFF" of the external program "008" from the external program "002". The terminal program 65 updates the activation parameter of the corresponding program record with the activation parameter obtained from the external program "002". Further, the terminal program 65 again displays the scan setting screen on the display 53 (S33).

Then, when a designation on the [scan] icon 145 is received through the input I/F 54 (S34: scan), the terminal program 65 transmits scan instruction information to the MFP 10A, which is the designated apparatus, via the communication I/F 55 (S37). The scan instruction information includes the condition parameters "name card", "fine", "one surface" and "color" designated in the pull-down menus 141, 142, 147, 148. The processing of S37 is an example of the formation instruction processing.

Although not shown, the apparatus program 35 of the MFP 10A receives the scan instruction information from the portable device 50 via the communication I/F 25. Then, the apparatus program 35 enables the scanner 12 to execute the scan operation in accordance with the condition parameters included in the scan instruction information. The scanner 12 reads an image recorded on a document set on a contact glass or an ADF (abbreviation of Auto Document Feeder) (not shown) and generates scan data indicative of the image. Then, the apparatus program 35 transmits the scan data generated by the scanner 12 to the portable device 50 via the communication I/F 25, as a response of the scan instruction information.

Then, the terminal program 65 of the portable device 50 receives the scan data from the MFP 10A via the communication I/F 55, and temporarily stores the received scan data in the memory 62. Then, the terminal program 65 determines whether the activation parameter corresponding to the function information "noise removal" obtained in S31 is "ON" (S38). Then, the terminal program 65 activates the external programs "003", "005", which is associated with the activation parameter "ON", of the external programs in which the function information obtained in S31 has "noise removal" set therein (S39). On the other hand, when there is no external program 66 in which the function information "noise removal" is set and the activation parameter "ON" is set, the terminal program 65 skips over the processing of S39. The processing of S38 is an example of the determination processing, and the processing of S39 is an example of the post-processing and the first post-processing.

More specifically, the terminal program 65 designates, as an argument, the program ID "003" and a pointer indicative of a head address of a memory region to store therein the scan data, and executes the activation API. Also, the OS 64 activates the external program "003" at the background. The external program "003" reads out the scan data from the memory region indicated by the designated pointer, executes skew correction for the read scan data, stores the scan data after the skew correction in the memory region indicated by the pointer, and ends the processing.

Then, the terminal program 65 designates, as an argument, the program ID "005" and a pointer indicative of a head address of a memory region to store therein the scan data after the skew correction, and executes the activation API. Also, the OS 64 activates the external program "005" at the background. The external program "005" reads out the scan data from the memory region indicated by the designated pointer, executes background color correction for the read scan data, stores the scan data after the background color correction in the memory region indicated by the pointer, and ends the processing.

That is, after executing the processing of S39, the scan data for which the skew correction and the background color correction have been executed is stored in the memory region indicated by the pointer. In the meantime, since the skew correction and the background color correction are implemented by the well-known algorithms, the detailed descriptions thereof are omitted. Also, the execution sequences of the external programs "003", "005" are not limited to the above example and may be reversed.

Subsequently, the terminal program 65 determines whether the activation parameter corresponding to the function information "image editing" obtained in S31 is "ON" (S40). Then, the terminal program 65 activates the external program "007", which is associated with the activation parameter "ON", of the external programs in which the function information obtained in S31 has "image editing" set therein (S41). More specifically, the terminal program 65 designates, as an argument, the program ID "007" and a pointer indicative of a head address of a memory region to store the scan data, and activates the activation API. Also, the OS 64 activates the external program "007" at the foreground. Also, the OS 64 switches the terminal program 65 from the foreground to the background. The processing of S40 is an example of the determination processing, and the processing of S41 is an example of the post-processing and the second post-processing.

When the external program "007" is activated from the terminal program 65 by the activation API, the external program "007" displays an OCR screen shown in FIG. 9A on the display 53. The OCR screen includes a scan image 161 and a [reading] icon 162. The scan image 161 is an image expressed by the scan data stored in the memory region indicated by the designated pointer. The [reading] icon 162 corresponds to an instruction to extract a character string included in the scan image 161. Then, the external program "007" receives a user operation on the OCR screen through the input I/F 54.

When a designation on the [reading] icon 162 is received through the input I/F 54, the external program "007" extracts character strings "O× Kabushiki Kaisha", "TOKKYO Taro" and "xx-yyyy-zzzz" by the well-known algorithm. Then, the external program "007" registers the extracted character strings in an address book of the memory 62 or the like, and ends the processing. Then, the OS 64 switches the terminal program 65 from the background to the foreground. Then, the terminal program 65 switched to the foreground ends the scan instruction processing.

On the other hand, when there is no external program 66 in which the function information "image editing" is set and the activation parameter "ON" is set, the terminal program 65 displays a scan result screen shown in FIG. 9B on the display 53, instead of the processing of S41 (S42). The scan result screen is an example of the second screen including a scan image 171, plug-in icons 172, 173, 174, a [save] icon 175 and an [end] icon 176. Then, the terminal program 65 receives a user operation on the scan result screen through the input I/F 54 (S43). The processing of S42 is an example of the second display processing, and the processing of S43 is an example of the second reception processing.

The scan image 171 is an image expressed by the scan data that has been generated in S37 by the scanner 12 and from which the noise has been removed in S39. The plug-in icons 172 to 174 are examples of the third object corresponding to the external programs "006", "007", "008" in which the function information obtained in S31 has "image editing" set therein. The [save] icon 175 corresponds to an instruction to store the scan data in the memory 62. The [end] icon 176 corresponds to an instruction to delete the scan data and to end the scan instruction processing.

Subsequently, when a designation on the plug-in icon 173 is received through the input I/F 54 (S43: PI), for example, the terminal program 65 executes the processing of S41. Also, when a designation on the [save] icon 175 is received through the input I/F 54 (S43: save), the terminal program 65 saves the scan data in the memory 62 (S44) and ends the scan instruction processing. Further, when a designation on the [end] icon 176 is received through the input I/F 54 (S43: end), the terminal program 65 skips over the processing of S41 and S44 and ends the scan instruction processing.

The processing of S37 to S43 is an example of the generation processing. That is, the terminal program 65 obtains the candidate parameters and the activation parameters from the external programs "001", "002" (S35), enables the scanner 12 to execute the scan operation in accordance with the designated condition parameters designated from the candidate parameters (S37) and activates the external programs "003", "005", "007" in accordance with the obtained activation parameters (S39, S41), thereby generating the image data.

[Operational Effects of Illustrative Embodiment]

According to the illustrative embodiment, it is possible to activate the external program 66, which is to be used for generation of the image data, at the appropriate timing in accordance with the function information before or after the processing of S37. Thereby, it is possible to smoothly execute a series of processing of generating the image data. Also, since only the function information of the external program 66 installed in the portable device 50 at the present moment is obtained, it is possible to suppress an unexpected error from occurring, which is caused when activating the external program 66 uninstalled after the install.

As an example, since it is possible to obtain the condition parameters configuring the execution condition of the scan operation before the processing of S37, it is possible to smoothly execute a series of processing of generating the image data. More specifically, it is possible to configure the execution condition of the scan operation by combining the condition parameters of the items "size" and "image quality", which can be designated with the standard function of the terminal program 65 by the user, and the condition parameters of the items "reading surface" and "reading color", which can be designated with the external program "001" by the user. Thereby, it is possible to enable the scanner 12 to execute the scan operation with the user's desired execution condition.

As another example, it is possible to enable the user to beforehand designate the external program 66, which is configured to execute the processing for the scan data generated by the scan operation, by using the external program "002". Thereby, since it is possible to automatically execute the user's desired processing for the scan data, it is possible to smoothly execute a series of processing of generating the image data.

Also, according to the illustrative embodiment, it is possible to activate the external program 66 in which the function information "image editing" is set, from the scan result screen. That is, it is possible to enable the user, who checks the scan image 171 after the noise is removed through the scan result screen, to select whether or not to activate the external program 66 for editing the scan data.

In the meantime, in each program record shown in FIG. 3, the setting value of the function information is only one. However, a plurality of setting values of the function information may be used. That is, the external program 66 may have a plurality of functions. The terminal program 66 may be configured to activate the external program 66 having a plurality of functions at a plurality of timings (S35, S39, S41) corresponding to the setting values of the function information.

Also, the type information for determining the activation timing of the external program 66 is not limited to the function information shown in FIG. 3. For example, the program record may include timing information shown in FIG. 10, instead of the function information shown in FIG. 3. The timing information is information indicative of the activation timing of the external program 66. In the timing information, "before scan" indicating that the activation should be made before the execution of the scan operation or "under scan" or "after scan" indicating that the activation should be made after the execution of the scan operation is set. Also, the external program 66 in which the timing information "under scan" is set indicates that it is to be activated earlier than the external program 66 in which the timing information "after scan" is set.

The external program 66 corresponding to the timing information "before scan" is an example of the first type of the external program 66. The external programs 66 corresponding to the timing information "under scan" and "after scan" are examples of the second type of the external program 66. Also, the timing information "before scan" may correspond to the function information "parameter designation", the timing information "under scan" may correspond to the function information "noise removal", and the timing information "after scan" may correspond to the function information "image editing".

In S31, the terminal program 65 may obtain the timing information of the external program 66 installed in the portable device 50 from the program list. Also, in S32, the terminal program 65 may determine whether the timing information "before scan" has been obtained. In addition, in S38 and S40, the terminal program 65 may determine whether the activation parameter corresponding to the timing information "under scan" or "after scan" is "ON". Like this, the type information that is to be used in the determinations of S32, S38 and S40 may be any information inasmuch as it can specify the activation timing of the corresponding external program 66.

It has been explained that, in the MFP 10 and the portable device 50 of the illustrative embodiment, the various programs stored in the memories 32, 62 are executed by the CPUs 31, 61, so that the respective processing to be executed by the controller of the disclosure is implemented. However, the configuration of the controller is not limited thereto, and some or all of the controller may be implemented by the hardware such as an integrated circuit and the like.

The disclosure can be implemented as not only the MFP 10 and the portable device 50 but also a program configured to enable the MFP 10 and the portable device 50 to execute the processing. The program may be provided with being recorded in a non-transitory recording medium. The non-transitory recording medium may include a memory mounted on a server that can be connected to the MFP 10 and the portable device 50 through the communication network 101, in addition to a CD-ROM, a DVD-ROM and the like. The program stored in the memory of the server may be transmitted through the communication network 101 such as the Internet, as information or signal indicative of the program.

What is claimed is:

1. A non-transitory computer-readable medium having a computer program stored thereon and readable by a computer of a portable device, the portable device comprising a memory and being communicable to an image forming device that is configured to execute a formation operation of forming image data, the memory storing a plurality of external programs that can be activated by the computer program, the computer program, when executed by the computer, causes the portable device to perform:
    determining from among the external programs, whether a first type external program is stored in the memory, the first type external program being to be activated at a first timing, the first timing being before execution of the formation operation;
    based on determining that the first type external program is stored in the memory,
        activating the first type external program,
        pre-processing of the formation operation with the activated first type external program, and
        after performing the pre-processing, transmitting, to the image forming device, an instruction to execute the formation operation;
    based on determining that the first type external program is not stored in the memory, transmitting, to the image forming device, the instruction to execute the formation operation, without activating the first type external program;
    receiving, from the image forming device, an image data that is formed in accordance with the instruction;
    determining, from among the external programs, whether a second type external program is stored in the memory, the second type external program being to be activated at a second timing, the second timing being after execution of the formation operation;
    based on determining that the second type external program is stored in the memory, activating the second type external program and instructing the second type external program to perform post-processing of the received image data; and
    based on determining that the second type external program is not stored in the memory, processing the received image data, without activating the second type external program.

2. The non-transitory computer-readable medium according to claim 1,
    wherein the first type external program is for enabling a user to designate a condition of the formation operation, and
    wherein the second type external program is for executing processing for the received image data.

3. The non-transitory computer-readable medium according to claim 1,
    wherein the computer program, when executed by the computer, causes the portable device to perform:
        in the pre-processing, obtaining a parameter indicating an execution condition of the formation operation, and
    wherein the instruction comprises controlling the image forming device to execute the formation operation in accordance with the parameter obtained in the pre-processing.

4. The non-transitory computer-readable medium according to claim 3,
    wherein the portable device comprises a display and an input interface,
    wherein the execution condition is specified by a combination of a first parameter and a second parameter, the first parameter being the parameter of a first item, and the second parameter being the parameter of a second item,
    wherein the computer program, when executed by the computer, causes the portable device to perform:
        displaying on the display a first screen comprising a first object and a second object, the first object being for receiving a designation on one of a plurality of candidates for the first parameter, the second object being for receiving a designation on the external program for receiving a designation on the second parameter; and
        receiving a user operation on the first screen through the input interface, and
    wherein the computer program, when executed by the computer, causes the portable device to perform:
        in response to the second object being designated in the receiving of the user operation on the first screen, activating the first type external program designated through the second object and obtaining the second parameter in the pre-processing,
        wherein the instruction comprises controlling the image forming device to execute the formation operation, in accordance with at least one of the first parameter designated through the first object and the second parameter obtained in the pre-processing.

5. The non-transitory computer-readable medium according to claim 1, wherein the computer program, when executed by the computer, causes the portable device to perform:
    in the pre-processing, obtaining a parameter indicating the second type external program that is to be activated in the post-processing; and
    in the post-processing, activating the second type external program that is indicated by the parameter obtained in the pre-processing.

6. The non-transitory computer-readable medium according to claim 3, wherein in the pre-processing, the computer program, when executed by the computer, causes the portable device to perform obtaining the parameter, a designation of which has been received through the input interface by the activated first type external program, from said first type external program.

7. The non-transitory computer-readable medium according to claim 3, wherein in the pre-processing, the computer program, when executed by the computer, causes the portable device to perform obtaining a plurality of candidates for the parameter from the activated first type external program and receiving a user operation of designating one of the plurality of obtained candidates through the input interface.

8. The non-transitory computer-readable medium according to claim 1,
wherein the portable device comprises a display and an input interface, and
wherein in the post-processing, the computer program, when executed by the computer, causes the portable device to perform:
first post-processing of activating the second type external program of removing a noise of the formation operation included in the image data formed in the instructing and obtaining the image data from which the noise has been removed;
displaying on the display a second screen, the second screen comprising an image expressed by the image data obtained in the first post-processing and a third object corresponding to the second type external program of editing the image data from which the noise has been removed;
receiving a user operation on the second screen through the input interface; and
in response to the third object being designated on the second screen, second post-processing of activating the second type external program corresponding to the third object and obtaining the edited image data.

9. The non-transitory computer-readable medium according to claim 1,
wherein the portable device comprises a display and an input interface, and
wherein the computer program, when executed by the computer, causes the portable device to perform:
displaying on the display a third screen, the third screen comprising a fourth object for receiving an execution instruction of the formation operation;
receiving a user operation on the third screen through the input interface; and
in response to the fourth object being designated in the receiving of the user operation on the third screen, determining whether the first type external program is stored in the memory.

10. The non-transitory computer-readable medium according to claim 5,
wherein the portable device comprises an input interface, and
wherein in the pre-processing, the computer program, when executed by the computer, causes the portable device to perform obtaining the parameter, a designation of which has been received through the input interface by the activated first type external program, from said first type external program.

11. The non-transitory computer-readable medium according to claim 5,
wherein the portable device comprises an input interface, and
wherein in the pre-processing, the computer program, when executed by the computer, causes the portable device to perform obtaining a plurality of candidates for the parameter from the activated first type external program and receiving a user operation of designating one of the plurality of obtained candidates through the input interface.

12. A portable device that is connectable to an image forming device configured to execute a formation operation of forming image data, the portable device comprising:
a display;
an input interface;
a processor; and
a memory that stores a main program and a plurality of external programs that can be activated by the main program, the main program, when executed by the processor, causes the portable device to perform:
determining, from among the external programs, whether a first type external program is stored in the memory, the first type external program being to be activated at a first timing, the first timing being before execution of the formation operation;
based on determining that the first type external program is stored in the memory,
activating the first type external program,
pre-processing of the formation operation with the activated first type external program, and
after performing the pre-processing, transmitting, to the image forming device, an instruction to execute the formation operation,
based on determining that the first type external program is not stored in the memory, transmitting, to the image forming device, the instruction to execute the formation operation, without activating the first type external program;
receiving, from the image forming device, an image data that is formed in accordance with the instruction;
determining, from among the external programs, whether a second type external program is stored in the memory, the second type external program being to be activated at a second timing, the second timing being after execution of the formation operation;
based on determining that the second type external program is stored in the memory, activating the second type external program and instructing the second type external program to perform post-processing of the received image data; and
based on determining that the second type external program is not stored in the memory, processing the received image data, without activating the second type external program.

13. The portable device according to claim 12,
wherein the first type external program is for causing the user to designate the parameter indicating the condition of generating the image data, and
wherein the second type external program is for executing processing for the image data generated by the image forming device.

14. The portable device according to claim 12, wherein the image forming device is a scanner connected to the portable device via a communication network or a camera connected to an interval bus of the portable device.

15. The portable device according to claim 12,
wherein the main program, when executed by the processor, causes the portable device to perform:
in the pre-processing, obtaining a parameter indicating an execution condition of the formation operation, and
wherein the instruction comprises controlling the image forming device to execute the formation operation in accordance with the parameter obtained in the pre-processing.

16. The portable device according to claim 12, wherein the main program, when executed by the processor, causes the portable device to perform:

in the pre-processing, obtaining a parameter indicating the second type external program that is to be activated in the post-processing; and in the post-processing, activating the second type external program that is indicated by the parameter obtained in the pre-processing.

17. The portable device according to claim 12,
wherein in the post-processing, the main program, when executed by the processor, causes the portable device to perform:
- first post-processing of activating the second type external program of removing a noise of the formation operation included in the image data formed in the instructing and obtaining the image data from which the noise has been removed;
- displaying on the display a second screen, the second screen comprising an image expressed by the image data obtained in the first post-processing and a third object corresponding to the second type external program of editing the image data from which the noise has been removed;
- receiving a user operation on the second screen through the input interface; and
- in response to the third object being designated on the second screen, second post-processing of activating the second type external program corresponding to the third object and obtaining the edited image data.

18. The portable device according to claim 12,
wherein the main program, when executed by the processor, causes the portable device to perform:
- displaying on the display a third screen, the third screen comprising a fourth object for receiving an execution instruction of the formation operation;
- receiving a user operation on the third screen through the input interface; and
- in response to the fourth object being designated in the receiving of the user operation on the third screen, determining whether the first type external program is stored in the memory.

19. A method for a portable device, the portable device comprising a memory and being communicable to an image forming device that is configured to execute a formation operation of forming image data, the memory storing a plurality of external programs that can be activated by the computer program, the method comprising:
- determining, from among the external programs, whether a first type external program is stored in the memory, the first type external program being to be activated at a first timing, the first timing being before execution of the formation operation;
- based on determining that the first type external program is stored in the memory,
  - activating the first type external program,
  - pre-processing of the formation operation with the activated first type external program, and
  - after performing the pre-processing, transmitting, to the image forming device, an instruction to execute the formation operation;
- based on determining that the first type external program is not stored in the memory, transmitting, to the image forming device, the instruction to execute the formation operation, without activating the first type external program;
- receiving, from the image forming device, an image data that is formed in accordance with the instruction;
- determining, from among the external programs, whether a second type external program is stored in the memory, the second type external program being to be activated at a second timing, the second timing being after execution of the formation operation;
- based on determining that the second type external program is stored in the memory, activating the second type external program and instructing the second type external program to perform post-processing of the received image data; and
- based on determining that the second type external program is not stored in the memory, processing the received image data, without activating the second type external program.

* * * * *